United States Patent [19]

Manabe

[11] Patent Number: 4,815,098
[45] Date of Patent: Mar. 21, 1989

[54] METHOD OF MEASURING FURNACE TEMPERATURE IN HOT ISOSTATIC PRESSING UNIT AND DEVICE FOR MEASURING SAME

[75] Inventor: Chitaka Manabe, Higashinada, Japan

[73] Assignee: Kabushiki Kaisha Kobe Seiko Sho, Kobe, Japan

[21] Appl. No.: 3,143

[22] Filed: Jan. 14, 1987

[30] Foreign Application Priority Data

Jan. 14, 1986 [JP] Japan .................................. 61-5551
Jan. 14, 1986 [JP] Japan .................................. 61-5552

[51] Int. Cl.⁴ .............................................. G01J 5/08
[52] U.S. Cl. .................................. 374/130; 374/121; 374/127; 350/413; 350/418; 350/483; 350/482
[58] Field of Search ............... 374/121, 130, 131, 126, 374/127, 128; 350/413, 415, 416, 418, 483; 356/44

[56] References Cited

U.S. PATENT DOCUMENTS

| | | | |
|---|---|---|---|
| Re. 30,804 | 11/1981 | Lindemann et al. ............... | 350/418 |
| 3,477,291 | 11/1969 | Osawa et al. ........................ | 374/127 |
| 3,586,419 | 6/1971 | Wakimoto ........................... | 350/418 |
| 3,626,194 | 12/1971 | Hirano ................................. | 350/413 |
| 3,626,758 | 12/1971 | Stewart et al. ...................... | 374/131 |
| 3,626,930 | 12/1971 | Toftness ............................... | 374/130 |
| 3,718,383 | 2/1973 | Moore .................................. | 350/413 |
| 3,759,102 | 9/1973 | Murray ................................ | 374/128 |
| 3,855,466 | 12/1974 | Schwarz .............................. | 374/128 |
| 4,525,080 | 6/1985 | Smith ................................... | 374/121 |
| 4,666,314 | 5/1987 | Tojyo et al. ......................... | 374/131 |

FOREIGN PATENT DOCUMENTS

| | | | |
|---|---|---|---|
| 44-30350 | 8/1969 | Japan .................................. | 350/418 |
| 0130625 | 10/1981 | Japan .................................. | 374/121 |
| 0195611 | 11/1984 | Japan .................................. | 350/413 |
| 79102265 | 12/1979 | Sweden . | |
| 10000 | of 1893 | United Kingdom ............... | 350/483 |

Primary Examiner—William A. Cuchlinski, Jr.
Assistant Examiner—Thomas B. Will
Attorney, Agent, or Firm—Oblon, Fisher, Spivak, McClelland & Maier

[57] ABSTRACT

A method of measuring a furnace temperature in a hot isostatic pressing unit, including the steps of condensing a thermal radiation beam from an end portion of a closed-end tube in a high-pressure furnace of the hot isostatic pressing unit by an optical system, feeding the radiation beam from the optical system to a detector to measure the temperature in the furnace, wherein the optical system includes a solid lens having an incoming surface formed by a spherical surface with center at a temperature measurement objective point and having an outgoing surface formed by a spherical surface with center at a light collecting point, so as to condense a radiant energy from the temperature measurement objective point. In another aspect of the invention, the steps further comprising removing a wavelength of absorption by a low b.p. metal gas vaporized from a treatment material in the furnace or a capsule glass.

20 Claims, 3 Drawing Sheets

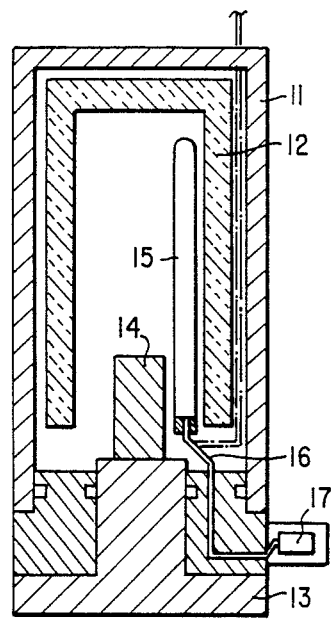
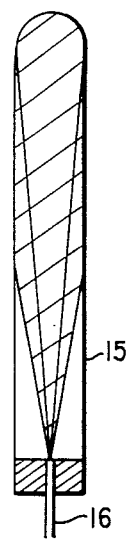
FIG. 9 PRIOR ART
FIG. 10 PRIOR ART
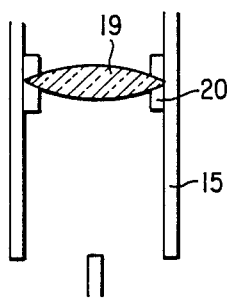
FIG. 11 PRIOR ART
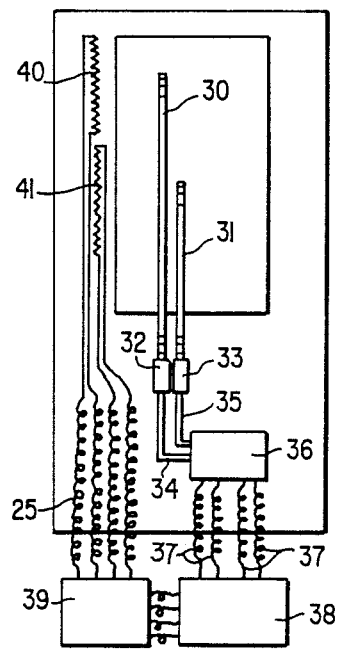
FIG. 12 PRIOR ART

METHOD OF MEASURING FURNACE TEMPERATURE IN HOT ISOSTATIC PRESSING UNIT AND DEVICE FOR MEASURING SAME

BACKGROUND OF THE INVENTION

The present invention relates to a method of measuring a furnace temperature in a hot isostatic pressing (HIP) unit and a device for measuring same, and more particularly to a method of measuring the furnace temperature in the HIP unit including an improved temperature measuring optical system for collecting thermal radiation from an end portion of a closed-end tube. Further, the present invention relates to a method of measuring the furnace temperature in the HIP unit which is improved in a wavelength range to be used for sensing of the temperature.

The HIP unit is used for carrying out pressure sintering of powder, removal of defects in a sintered product or a forged product, or diffused junction owing to a synergetic effect by high temperature and high pressure. In recent years, industrial utilization of the HIP unit has become noticeable, and application thereof has been recently expanded to a high temperature range of 1700°–2100° C. for an engineering ceramics.

In the HIP unit, temperature control of a furnace at high temperature under high pressure is greatly significant for treatment effect, and there have been proposed various temperature measuring means for detecting the furnace temperature. At present, radiation temperature measuring means utilizing a closed-end tube has been adopted, for example.

FIGS. 9 and 12 show some examples of conventional HIP units including such furnace temperature measuring means.

The HIP unit as shown in FIG. 9 includes a closed-end tube 15 and an optical system 16. A sample bed 14 is placed on a lower cover 13 of a high pressure vessel 11 containing a heat insulating layer 12. The interior of the vessel 11 is partitioned by the heat insulating layer 12 to define a furnace chamber in which the closed-end tube 15 is located in such a manner that an end portion of the closed-end tube 15 is exposed to an area to be detected. Thermal radiation from the closed-end tube 15 is introduced to the outside of the furnace chamber via the optical fiber 16 connected at its one end to a lower end of the closed-end tube 15. The optical fiber 16 is connected at the other end to a radiation thermometer 17 constituting a measuring system. This unit is disclosed in Japanese Patent Laid-Open No. 60-133327. As shown in FIG. 10, the radiation beam from the closed-end tube 15 is allowed to directly enter the optical fiber 16. Alternately, as shown in FIG. 11, the radiation beam is condensed by a collimator 20 using a lens 19 to enter the optical fiber 16.

In the HIP unit as shown in FIG. 12, long and short slender cylindrical tubes 30 and 31 closed at their upper ends and open at their lower ends are located in such a manner that respective upper portions thereof are enclosed in a furnace chamber or a treating chamber, while the lower ends are positioned outside the treating chamber. Measuring terminals 32 and 33 of a radiation thermometer are mounted at the open lower ends of the tubes 30 and 31 so that a focal point may be formed at the close upper ends of the tubes 30 and 31. Detection signals from the measuring terminals 32 and 33 are fed through optical signal cables 34 and 35 to a photoelectric converter 36 in the HIP unit, thereby taking out an output corresponding to the temperature through lead wires 37 passing through a high pressure vessel. The output is supplied to a treating chamber temperature automatic control device 38 and a thyristor control device 39 to control upper and lower heaters 40 and 41 through lead lines 25. This unit is disclosed in Japanese Patent Laid-Open No. 60-144627.

However, the place where the optical system is located is usually subjected to a temperature of 300° C. under a pressure of 2000 atm, and a density of Ar or $N_2$ gas forming such an atmosphere is higher than that at ordinary temperature and ordinary pressure. Especially, as temperature of a part where the collimator (FIG. 11) is located in the unit shown in FIG. 9 is relatively low, an atmosphere around the part has more increased density.

As a result, a refractive index of the gas increases with an increase in the density, and becomes higher than a value at ordinary temperature and ordinary pressure. Accordingly, optical characteristics of the lens and the optical fiber, which are designed for use in the air under the conditions of ordinary temperature and ordinary pressure, e.g., a focal distance of the lens and a numerical aperture of the optical fiber are changed to cause an influence upon thermometer characteristics.

Describing the above in detail, the focal distance of the lens is usually expressed in the following equation.

$$f = \frac{1}{n-1} \frac{r_1 r_2}{r_2 - r_1}$$

Where, $r_1$ and $r_2$ are radii of curvature of both surfaces of the lens; $n = n_L/n_g$, where $n_L$ is an absolute refractive index of the lens, and $n_g$ is an absolute refractive index of a medium around the lens.

When the medium gas is in the conditions of ordinary temperature and ordinary temperature, $n_g$ is substantially equal to 1, and the lens is designed under such conditions.

However, the absolute refractive index of the gas changes with pressure as shown in the following table, and therefore, the focal distance is changed according to the above-mentioned equation. (High-Pressure Testing Techniques and Their Applications, pp. 441)

TABLE

| $N_2$ | | Ar | |
|---|---|---|---|
| Temp.: 25° C. Wavelength: 5876A | | Temp.: 25° C. Wavelength: 5876A | |
| Pressure (atm) | Refractive Index | Pressure (atm) | Refractive Index |
| 1 | 1.0002728 | 1 | 1.0002580 |
| 61.164 | 1.01665 | 21.4042 | 1.00576 |
| 162.332 | 1.04333 | 35.0086 | 1.00921 |
| 162.455 | 1.04332 | 50.6661 | 1.01365 |
| 304.27 | 1.07311 | 69.8965 | 1.01878 |
| 405.76 | 1.08911 | 100.809 | 1.02761 |
| 528.50 | 1.10429 | 201.127 | 1.05522 |
| 750.74 | 1.12432 | 381.490 | 1.09522 |
| 894.59 | 1.13414 | 690.792 | 1.13505 |
| 1138.12 | 1.14752 | 1040.37 | 1.16078 |
| 1646.63 | 1.16763 | 1539.35 | 1.18409 |
| 2053.07 | 1.17941 | 2369.75 | 1.20899 |

Although the density tends to decrease naturally because of high temperature as well as high pressure in the HIP unit, and a change rate of the refractive index is less than that shown in Table, the condition of the temperature measuring optical system is yet changed.

In the circumstances, the conventional temperature measuring means does not satisfactorily follow the change in the refractive index of the medium gas due to operational conditions of the HIP unit, and cannot attain stable measurement of temperature.

Furthermore, in the method where the radiation beam from the end portion of the closed-end tube is allowed to directly enter the optical fiber, thermal radiation from a side wall of the closed-end tube 15 having a temperature distribution is also allowed to enter the optical fiber because of a wide angle of visible field of the optical fiber, and such thermal radiation is added to the thermal radiation from the end portion of the closed-end tube, thereby causing an error of temperature measurement at the end portion.

To eliminate this error, there has been conducted a test to find that a temperature measurement error at temperatures near 2000° C. can be suppressed to 1% or less by setting a detection wavelength to 0.6 $\mu$m or less. However, in the case that the collimator is used to limit the field of observation at the end portion of the closed-end tube, the above-mentioned setting of the wavelength is not required.

Although the temperature measurement error is reduced by shortening the wavelength, a limited short wavelength is to be considered from limitation of optical materials, and it has been found that detection of the radiation beam is difficult by the wavelength of 0.2 $\mu$m or less and that the wavelength equal to or more than 0.3 $\mu$m is preferable.

Additionally, provided that a photon counting method by means of a photomultiplier (PM) is employed, dependency of temperature resolution upon wavelength has been calculated for an object at 1000° C. with a time constant of one second. As the result of calculation, it has been clarified that the wavelength equal to or more than 0.3 $\mu$m is required for 1 K or more of temperature resolution.

Accordingly, the temperature measurement by the radiation thermometer is actually conducted within the wavelength range of 0.3–0.6 $\mu$m, while it is conducted within the range of 0.3 $\mu$m or more in the case of limiting a field of observation at a measurement objective point by means of a collimator or the like.

However, as to spectral characteristics of the radiation beam utilized for the temperature measurement, there is no mention except a black body and a gray body.

An actual spectrum of the radiation beam from the HIP unit is shown in FIG. 8, wherein a clear absorption is observed. This absorption is caused by vaporization of a low b.p. metal from a treatment material in the furnace or a capsule glass in the HIP unit. That is, the low b.p. metal in the high-temperature closed vessel of the HIP unit is vaporized during an increase in temperature to generate a gas, which stays in the vessel without being discharged therefrom. As a result, there occurs absorption by the metal gas existing in a light path between the objective point and the collimator in conducting a radiation temperature measurement.

However, the conventional temperature measuring method does not consider such absorption by the metal gas, and there is a possibility that the absorption by the metal gas is overlapped on the wavelength to be used for the temperature measurement to cause a large error.

SUMMARY OF THE INVENTION

It is an object of the present invention to provide a method of measuring a furnace temperature in a HIP unit and a device for measuring same which may conduct stable temperature measurement not influenced by a change in refractive index of a medium gas due to fluctuations in temperature and pressure of an atmosphere in the furnace.

It is another object of the present invention to provide a method of measuring a furnace temperature in a HIP unit and a device for measuring same which may conduct accurate temperature measurement removing absorption by a low b.p. metal gas vaporized in the furnace.

According to one aspect of the present invention, there is provided a method of measuring a furnace temperature in a hot isostatic pressing unit, comprising the steps of condensing a thermal radiation beam from an end portion of a closed-end tube in a high-pressure furnace of the hot isostatic pressing unit by means of an optical system, feeding the radiation beam from the optical system to a detector to measure the temperature in the furnace, wherein the optical system comprises a solid lens having an incoming surface formed by a spherical surface with center at a temperature measurement objective point and having an outgoing surface formed by a spherical surface with center at a light collecting point, so as to condense a radiant energy from the temperature measurement objective point.

The optical system for temperature measurement usually corresponds to a collimator system. The temperature measurement objective point corresponds to the end portion of the closed-end tube, and the light collecting point corresponds to an aperture of a photo detecting member such as an optical fiber or a photodetector itself.

As is well-known the detector is constituted of a photoelectric converter, amplifier, radiation rate correction circuit and linearizer, etc., and it is designed to carry out indication of temperature.

The solid lens of the optical system has concave incoming and outgoing surfaces. If the solid lens is formed of a uniform material, a light condensing function cannot be obtained. Therefore, a convex lens member having a high refractive index is incorporated in the solid lens to form the solid lens into a convex lens as a whole, thereby exhibiting the light condensing function.

Concretely, the solid lens having the light condensing function may be easily obtained by combining plural lenses, e.g., three lenses having different refractive indexes, or by using a lens having a distribution of refractive index therein.

According to the above-mentioned constitution, the radiation beam from the temperature measurement objective point enters the lens at right angles to the incoming surface, and leaves the lens at right angles to the outgoing surface. That is, no refraction occurs on the incoming surface and the outgoing surface of the lens. Therefore, even when the refractive index of the medium around the lens is changed with fluctuations of temperature and pressure, the radiation beam is not influenced by the change in the refractive index of the medium, thereby ensuring stable temperature measurement.

According to another aspect of the present invention, there is provided a method of measuring a furnace temperature in a hot isostatic pressing unit, comprising the steps of condensing a thermal radiation beam from an end portion of a closed-end tube in a high-pressure furnace of the hot isostatic pressing unit by means of an optical system, removing a wavelength of absorption by a low b.p. metal gas vaporized from a treatment material in the furnace or a capsule glass, and feeding the radiation beam from the optical system to a signal processing device to measure the temperature in the furnace.

The wavelength of radiation beam to be measured is, of course, in the range of 0.3–0.6 μm as mentioned above, while it is not less than 0.3 μm in the case that the collimator is used to limit a field of observation to the temperature measurement objective point. Removal of the wavelength of absorption by the low b.p. metal gas may be easily attained by using a filter permitting transmission of a wavelength range except the absorption wavelength of the low b.p. metal.

According to the above-mentioned constitution, even when the low b.p. metal gas is present in the HIP unit, absorption of the radiation beam by the metal gas may be avoided to thereby ensure accurate temperature measurement.

Other objects and features of the invention will be more fully understood from the following detailed description and appended claims when taken with the accompanying drawings.

BRIEF DESCRIPTION OF THE DRAWINGS

FIG. 9 is a sectional view of the HIP unit in the prior art;

FIGS. 10 and 11 are enlarged views of the optical system employed in the HIP unit of FIG. 9; and FIG. 12 is a sectional view of another HIP unit in the prior art.

DETAILED DESCRIPTION OF THE PREFERRED EMBODIMENTS

Figure 1:
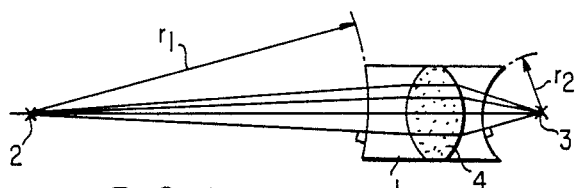
FIGS. 1 to 5 are schematic illustrations of the preferred embodiments of the optical system employed in the present invention.

There will be now described some preferred embodiments of the present invention with reference to the accompanying drawings.

FIGS. 1 to 5 show some examples of the optical system forming the essential part of the present invention, wherein a body of the HIP unit is not illustrated, but the optical systems shown are adapted to the collimator system of the known HIP unit shown in FIG. 9.

Referring to FIGS. 1 to 5, reference numerals 1, 2 and 3 designate a lens, a temperature measurement objective point, and a light collecting point, respectively. The incoming surface of the lens 1 is formed by a spherical surface having a radius $r_1$ with center at the temperature measurement objective point 2, while the outgoing surface is formed by a spherical surface having a radius $r_2$ with center at the light collecting point 3.

In the embodiment shown in FIG. 1, the incoming surface and the outgoing surface are concave. If the lens 1 were formed of a uniform material, a light condensing function would not be obtained. Accordingly, a convex lens portion 4 having a high refractive index is provided in the lens 1 to form a convex lens as a whole, thus exhibiting the light condensing function.

The lens 1 may be prepared by combining three lenses having different refractive indexes, for example. In this case, it is necessary to sufficiently contact each surface of the lenses to be combined to such an extent that a medium existing in a gap between the lenses influences ignorably upon refraction of the beam.

The lenses to be combined may be formed by a plurality of lenses, provided that the incoming and outgoing surfaces of the lens 1 meet the afore-mentioned requirements to function as a convex lens as a whole.

Figure 2:
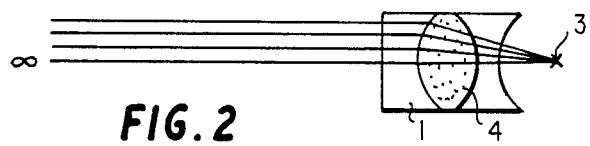
Figure 3:
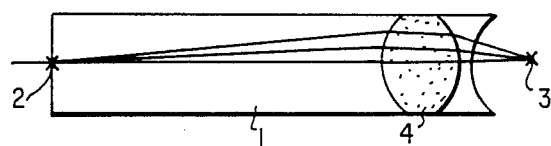
Figure 4:
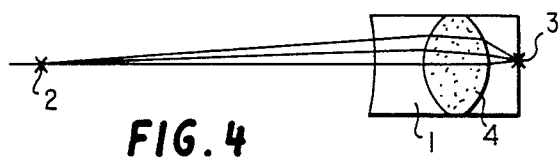

FIG. 2 shows an example where the temperature measurement objective point 2 is positioned at infinity, and FIG. 3 shows an example where the temperature measurement objective point 2 is positioned in contact with the incoming surface of the lens 1. In both the examples, the incoming surface is a substantially flat plane. FIG. 4 shows an example where the light collecting point 3 is positioned in contact with the outgoing surface of the lens 1, and the outgoing surface is a substantially flat plane.

In the above-mentioned examples of FIGS. 2, 3 and 4, no refraction occurs on the incoming surface and the outgoing surface like the example of FIG. 1, and the radiation beam is not influenced.

Figure 5:
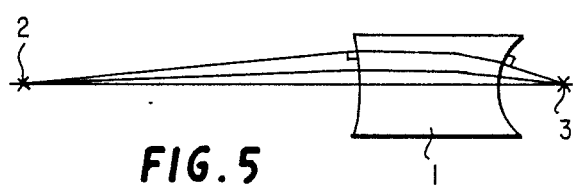

In substitution for the above-mentioned combination lens, a refractive index distributed lens having a function of a convex lens may be used as shown in FIG. 5. The refractive index distributed lens is formed by a single lens having a refractive index distribution such that a refractive index is gradually decreased from an optical axial portion of the lens to a peripheral portion. In this embodiment, the incoming surface and the outgoing surface meet the afore-mentioned requirements like the embodiment of FIG. 1.

In this manner, the optical system is formed by the lens system as mentioned above. A radiant energy collected by the optical system is transmitted through an optical fiber or the like to a detector, and is then applied to indication of temperature or heater control as required.

Figure 6:
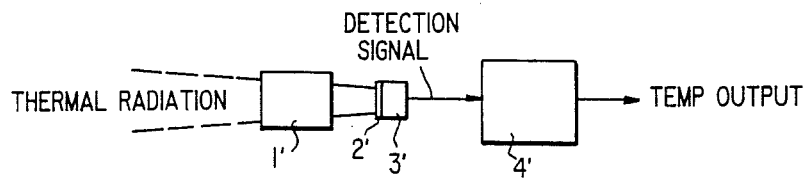
FIGS. 6 and 7 are schematic diagrams of the preferred embodiments of the present invention.

Referring next to FIG. 6 which shows an optical system schematically according to the present invention, the optical system includes a condensing system 1' such as a collimator, a filter 2', a photo-detecting unit 3' and a signal processing unit 4'. A radiation beam from an end portion of a closed-end tube (not shown) is condensed by the optical system 1'. The filter 2' functions to remove an absorption wavelength of a low b.p. metal and select a wavelength range other than the absorption wavelength. Then, the radiation beam having the wavelength range is transmitted through an optical fiber (not shown) to the signal processing unit 4'. The signal processing unit 4' functions to conduct photoelectric conversion to generate a temperature output for indication of temperature or heater control as required.

During the course of the temperature measurement as mentioned above, it is significant that the wavelength range is selected by the filter 2'. The absorption wavelength of the low b.p. metal to be removed is determined as follows: (1) Metal vaporizable at a supposed temperature is selected. (2) A spectral wavelength where a metal atom in the ground state is excited is selected since a large number of atoms are in the ground state at temperatures (~2500 K) in the HIP unit.

A temperature measuring system is not particularly limited, but may includes any means capable of removing the absorption wavelength of the low b.p. metal.

Figure 7:
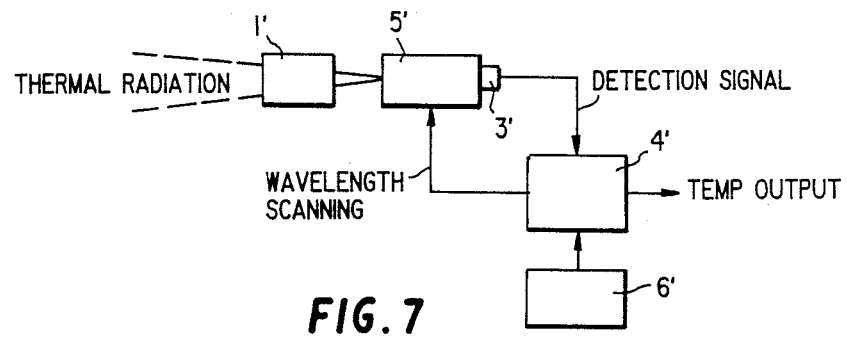
Figure 8:
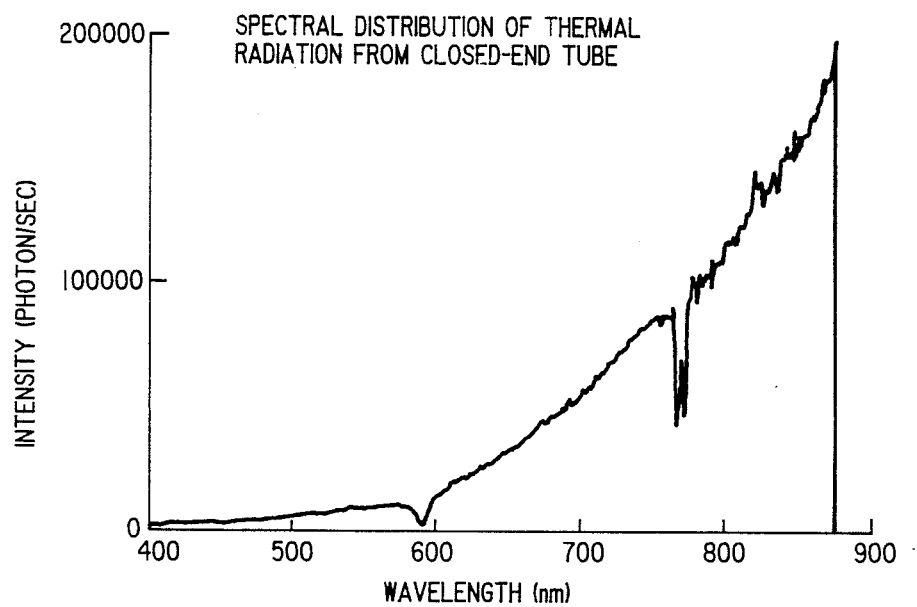
FIG. 8 is a graph showing a spectral distribution of the thermal radiation from the closed-end tube.

FIG. 7 shows an alternate embodiment using a spectro thermometer. A table 6' stores a data corresponding to an absorption wavelength of the low b.p. metal. The signal processing unit receives a detection signal from a spectroscope 5', and removes the data corresponding to the absorption wavelength stored in the table 6' from the detection signal. In this case, wavelength scanning may be cancelled.

Thus, even when the low b.p. metal gas is contained in the HIP unit, temperature measurement may be conducted with no influence of the metal gas.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. ( A method of measuring a furnace temperature in a hot isostatic pressing unit, comprising the steps of condensing a thermal radiation beam from an end portion of a closed-end tube in a high-pressure furnace of said hot isostatic pressing unit by means of an optical system, feeding said radiation beam from said optical system to a detector to measure the temperature in said furnace, wherein said optical system comprises a solid lens having an incoming surface formed by a spherical surface with center at a temperature measurement objective point and having an outgoing surface formed by a spherical surface with center at a light collecting point, said solid lens having a refractive index which varies so as to condense a radiant energy from said temperature measurement objective point at said collecting point.

2. The method as defined in claim 1, wherein said solid lens includes a convex lens portion having a high refractive index.

3. The method as defined in claim 2, wherein said solid lens comprises a combination of plural lenses having different refractive indexes.

4. The method as defined in claim 2, wherein said temperature measurement objective point is positioned at infinity.

5. The method as defined in claim 2, wherein said temperature measurement objective point is positioned in contact with said incoming surface of said solid lens.

6. The method as defined in claim 2, wherein said light collecting point is positioned in contact with said outgoing surface of said solid lens.

7. The method as defined in claim 1, wherein said solid lens comprises a single lens having a refractive index distribution such that a refractive index is gradually decreased from an optical axial portion of said lens to a peripheral portion.

8. The method of measuring a furnace temperature in a hot isostatic pressing unit according to claim 1, further comprising the step of removing a wavelength of absorption by a low b.p. metal gas vaporized from a treatment material in said furnace or a capsule glass 9. The method as defined in claim 8, wherein said wavelength of absorption by the low b.p. metal gas is removed by means of a filter.

10. The method as defined in claim 8, wherein said detector receives a detection signal from a spectroscope and removes from said detection signal a data corresponding to said wavelength of absorption stored in a table.

11. A device for measuring a furnace temperature in a hot isostatic pressing unit, comprising a closed-end tube provided in a highpressure furnace in said unit, an optical system for condensing a thermal radiation beam from an end portion of said closed-end tube, and a signal processing device for detecting said radiation beam fed from said optical system and conducting photoelectric conversion, wherein said optical system comprises a solid lens having an incoming surface formed by a spherical surface with center at a temperature measurement objective point and having an outgoing surface formed by a spherical surface with center at a light collecting point, said solid lens having a refractive index which varies, so as to condense said thermal radiation beam from said temperature measurement objective point at said light collecting point.

12. The device as defined in claim 11, wherein said solid lens includes a convex lens portion having a high refractive index.

13. The device as defined in claim 11, wherein said solid lens comprises a combination of plural lenses having different refractive indexes.

14. The device as defined in claim 12, wherein said temperature measurement objective point is positioned at infinity.

15. The device as defined in claim 12, wherein said temperature measurement objective point is positioned in contact with said incoming surface of said solid lens.

16. The device as defined in claim 12, wherein said light collecting point is positioned in contact with said outgoing surface of said solid lens.

17. The device as defined in claim 11, wherein said solid lens comprises a single lens having a refractive index distribution such that a refractive index is gradually decreased from an optical axial portion of said lens to a peripheral portion.

18. The device for measuring a furnace temperature in a hot isostatic pressing unit according to claim 11, further comprising means for removing an absorption wavelength of a low b.p. metal gas vaporized from a treatment material in said furnace or a capsule glass.

19. The device as defined in claim 18, wherein said means for removing the absorption wavelength comprises a filter interposed between said optical system and said signal processing device.

20. The device as defined in claim 18, wherein said means for removing the absorption wavelength comprises a spectroscope for detecting said radiation beam from said optical system, a memory preliminarily storing a data corresponding to said absorption wavelength, and a processing unit for removing said data from a detection signal fed from said spectroscope.

* * * * *